July 17, 1951   M. S. JOHNSON ET AL   2,561,121
PIPE ANCHOR
Filed April 13, 1949   2 Sheets-Sheet 1
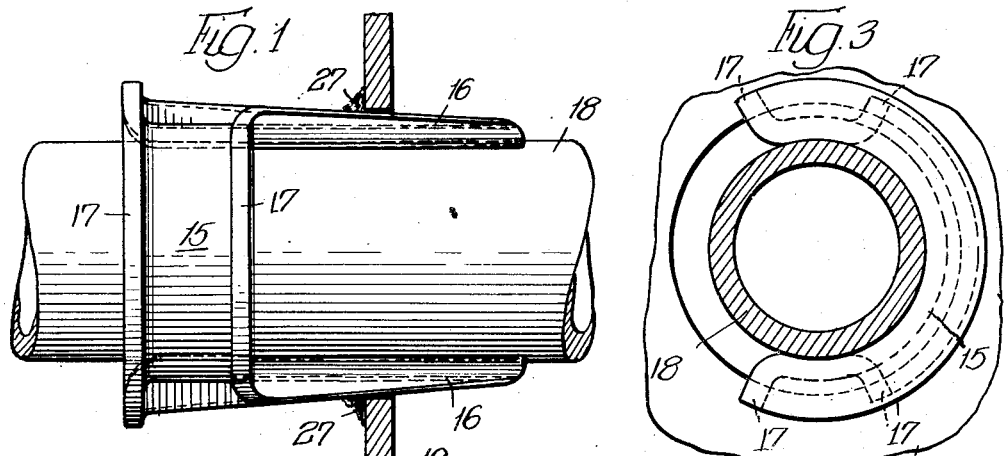
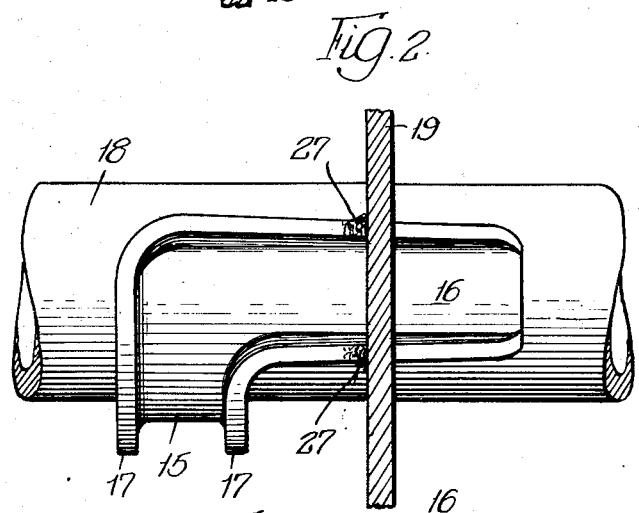
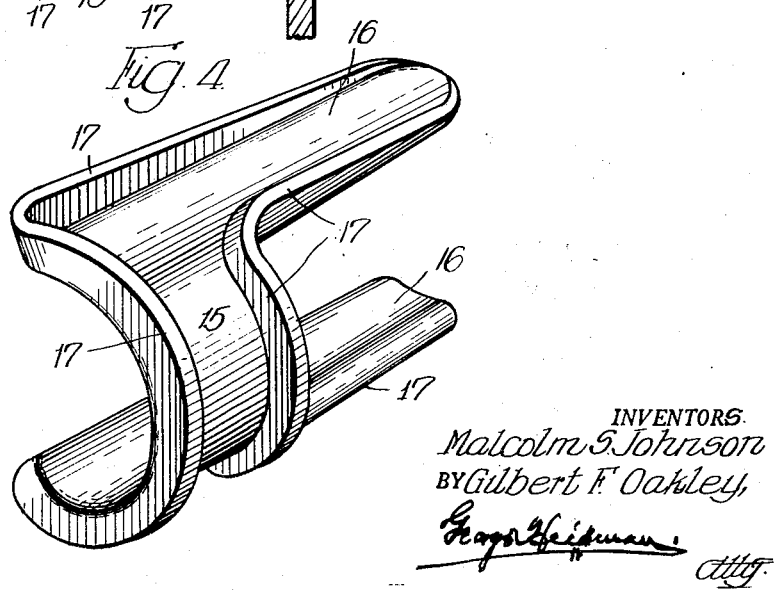
INVENTORS
Malcolm S. Johnson
BY Gilbert F. Oakley July 17, 1951  M. S. JOHNSON ET AL  2,561,121
PIPE ANCHOR
Filed April 13, 1949  2 Sheets-Sheet 2

INVENTORS
Malcolm S. Johnson,
BY Gilbert F. Oakley,

Patented July 17, 1951

2,561,121

UNITED STATES PATENT OFFICE 2,561,121

PIPE ANCHOR

Malcolm S. Johnson and Gilbert F. Oakley, Chicago, Ill., assignors to Central Railway Supply Company, Chicago, Ill., a corporation of Illinois Application April 13, 1949, Serial No. 87,154

3 Claims. (Cl. 248—55)

Our invention relates to a pipe clamp or anchor more especially intended for rigidly securing the air lines or train pipes to the car underframe members or cross-bearers against longitudinal movement and undesirable vibration to prevent ruptures and leaks.

The invention has for one of its objects the provision of a single piece anchor which may be readily applied to previously installed train pipes; which simultaneously effects firm clamping relation with opposite sides and longitudinally of the pipes; and which obviates the need of brackets or other fittings which must be secured to the car members by bolts or separate fastening elements requiring the drilling of holes in the car undersills or cross-bearers.

Our invention contemplates a comparatively simple single piece member which may be readily stamped or pressed out of a single piece of steel, or consist of a drop forging, which may be intimately secured to the cross-bearers of the car after the anchors have been applied to the pipes and properly positioned in the pipe receiving opening in the cross-bearer.

Another object of the invention is the provision of a single piece anchor formed of metal possessing enough resiliency to permit it to be "sprung" onto the pipe and thus compensate for slight variances in a given sized pipe and which will present wedging surfaces about the center line of the pipe whereby pressures are uniformly exerted on the pipe and the latter not subject to bending stresses, while the pipe is centered in the opening through which it passes and movement in any direction fully restricted.

The foregoing objects and advantages of the invention, as well as other advantages inherent in the improved anchor, will all be fully comprehended from the following detailed description of the accompanying drawings in which:

Figure 1 is a side view of our improved anchor applied to a section of pipe and shown attached to a car underframe member or cross-bearer of which a portion in section is shown.

Figure 2 is a plan view of the structure shown in Figure 1.

Figure 3 is an end view of the rear end of the anchor, as viewed from the left in Figure 1.

Figure 4 is a perspective view of our improved anchor.

Figure 5:
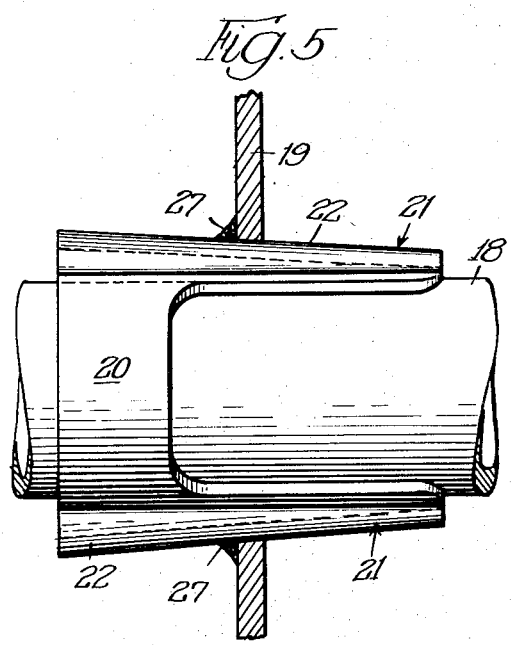
Figure 5 is a view similar to Figure 1 illustrating a modified form.

Our improved anchor, which preferably consists of a single piece member, may either consist of pressed steel or a drop forging possessing sufficient resiliency to enable the anchor to be flexed or "sprung" onto the pipe when applied to a previously installed pipe.

The anchor illustrated in the first four figures of the drawings discloses a pressed steel clamp having a substantially semi-circular body portion or rear end 15 whose segmental ends terminate in the forwardly presented fingers or members 16, 16.

In order to afford sufficient rigidity, the marginal edges of the body portion and of the fingers are provided with rigidifying outwardly turned flanges 17 as shown in Figure 4; and the fingers preferably are somewhat tapered toward their free ends.

The inner surfaces of the fingers 16, 16 are preferably dished or slightly concaved to provide pipe seating surfaces and afford comparatively wide and longitudinal pipe engaging surfaces which will exert uniform pressure at opposite sides of the pipe; it being understood that our improved anchor is intended to partially encircle the pipe, a section of which is shown at 18, and to also enter the pipe receiving annular hole formed in the cross bearer or diaphragm of the car underframe members shown at 19.

The anchors are made to fit pipes of a given size and the distance between the fingers at the segmental ends of the body portion normally is slightly less than the diameter of the pipe for which the clamp is intended, thus necessitating the clamp to be "sprung" onto a previously installed pipe when the clamp or anchor is laterally applied.

The anchor having been applied with its fingers disposed toward the underframe member 19 is then slid along the pipe and the fingers forced into the hole in the underframe member causing the marginal flanges 17 to effect binding relation with the underframe member; and as the fingers 16 and their flanges 17 are of similar dimensions and symmetrical about the center line, the pipe will be centered in the hole and hence the pipes will be aligned throughout and maintained in alignment. The flange 17, at the outer or rear end of the anchor, provides a driving surface which enables the anchor to be firmly driven into the hole at opposite sides of the pipe as shown in Figure 1 thereby simultaneously effecting wedging relation with the underframe member and uniform clamping relation with two sides of the pipe without subjecting the latter to bending stresses.

Figure 6:
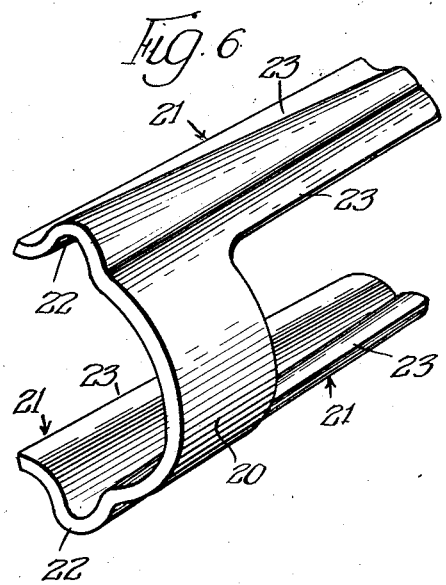
Figure 6 is a perspective view of the modified form of anchor shown in Figure 5.

The modification shown in Figures 5 and 6 also comprises a single piece stamping or pressed steel construction having a substantially semi-circular body portion or rear end 20 whose segmental ends terminate in the forwardly presented fingers or members 21, 21, of preselected length.

In order to provide the fingers or members with sufficient rigidity and also afford wedging surfaces, the fingers 21, 21 are provided with the longitudinal corrugation 22 disposed throughout the length of the fingers and tapered or decreased in height toward the inner unattached ends of the fingers as more clearly seen in Figure 6; the corrugations 22 preferably being formed along the longitudinal median line of the fingers so as to provide the comparatively wide marginal portions 23, 23 which constitute pipe clamping surfaces.

Similar to the structure shown in Figure 4, the anchor of Figures 5 and 6 is formed with the normal distance between the free longitudinal edges of the fingers intended to be slightly less than the diameter of the pipe for which the anchor is intended while the resiliency of the connecting band or body portion 20 will enable the anchor to be sidewisely applied or "sprung" onto the pipe 18 if the latter has previously been installed; otherwise the anchor may be endwisely slipped onto the pipe during installation of the train line.

The applied anchor is then moved toward the apertured underframe member or cross-bearer 19 and the fingers 21, 21 forced and firmly driven into the hole of the cross-bearer 19, causing the corrugations 22 to effect wedging relation with the cross-bearer and inducing the marginal surfaces of the fingers to firmly grip the train line or pipe 18 and hold the latter against vibration and movement.

Figure 7:
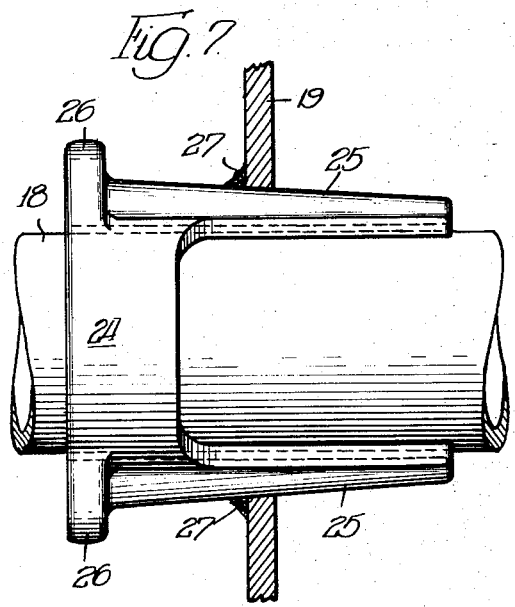
Figure 7 is a view similar to Figure 1 showing another modification of the invention preferably in the nature of a drop forging.
Figure 8:
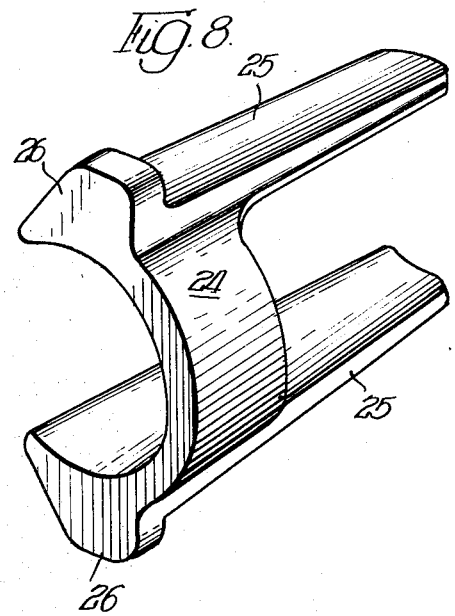
Figure 8 is a perspective view of the forged anchor shown in Figure 7.

The modification of Figures 7 and 8 comprises a forging constituting an anchor involving the principles of the previously described structures and consists of the rear end or substantially semi-circular body portion 24 integral with the rear end of the spaced forwardly extending fingers or members 25, 25 which preferably taper somewhat toward their free forward ends, both in thickness and transverse dimensions. The rear ends of the fingers or members 25, 25 and the connecting body portion 24 preferably are somewhat enlarged to provide the driving lugs or surfaces 26, which enable the anchor to be firmly driven into the hole in the cross-bearer or underframe member 19 and thereby force the fingers or members of the anchor into firm clamping relation with the pipe 18.

As is apparent from the structures shown and described, after they have been firmly driven into the annular holes in the car underframe members in extended longitudinal gripping engagement with the pipe at opposite sides of the pipe, the pipe is thereby centered in the hole, its alignment is maintained without causing a rupture or undesirable stress in the pipe.

The inner longitudinal faces of the fingers or members preferably are somewhat transversely arcuate to uniformly hug the sides of the pipe.

Our improved anchors, as is apparent, before being driven into firm wedging position, may be rotated on the pipe to any position most convenient for application and after being driven into clamping position are then preferably tack welded to the supporting underframe member as indicated at 27.

It is also apparent from the structures described, that in the event of a rupture of the weld between the clamp and the car underframe allowing the clamp to back out of the underframe hole, our improved clamp cannot drop away or become lost due to the fact that it is sprung or snapped onto the pipe, as the distance between the ends of the split connecting body portion and between the longitudinal edges of the fingers is less than the diameter of the pipe for which the clamp is intended.

We have shown and described the various modifications of our invention in language employed for purposes of description and not as language of limitation, as structural modifications are possible and may be made without departing from the spirit of our invention as defined in the appended claims.

What we claim is:

1. A pipe anchor comprising a substantially semi-circular and springy band and circumferentially spaced elongated finger-like elements integral with the ends of the band and disposed forwardly at right angles to the band to extend longitudinally with the sides of the pipe, the band and elements having concaved pipe seating inner surfaces while the exterior of the anchor has tapered wedge providing surfaces.

2. In combination with a railroad car undersill or cross-bearer with an opening for passage of a train pipe or air line therethrough, a pipe anchor for holding the pipe against vibration or movement and consisting of a semi-circular body portion adapted to be sprung on the pipe from the side, the ends of said body portion terminating in a pair of right angularly disposed substantially parallel prongs tapering in width and thickness toward their outer ends to enter the pipe receiving opening.

3. In combination with an air line or train pipe of a railroad car and a car undersill or cross-bearer of a railroad car apertured for passage of the pipe therethrough, a pipe anchor consisting of a semi-circular band-like portion adapted to be edgewisely sprung onto the pipe to extend partly there-about, the ends of the band-like portion terminating in a pair of laterally extending prongs arranged substantially parallel with each other and tapering in width and thickness toward their forward ends and to be driven through said pipe receiving aperture to effect binding relation with opposite sides and lengthwisely of the pipe, the inner surfaces of said prongs being dished to receive the sides of the pipe.

MALCOLM S. JOHNSON.
GILBERT F. OAKLEY.

REFERENCES CITED

The following references are of record in the file of this patent:

UNITED STATES PATENTS

| Number | Name | Date |
|---|---|---|
| D. 150,460 | Price | Aug. 3, 1948 |
| 1,757,570 | Hoerr | May 6, 1930 |
| 1,773,142 | Hoerr et al. | Aug. 19, 1930 |
| 1,821,294 | Dieter | Sept. 1, 1931 |
| 2,487,315 | Crampton | Nov. 8, 1949 |